G. W. COOK.
Driving-Reins.
No. 148,550. Patented March 17, 1874.
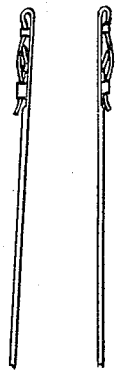
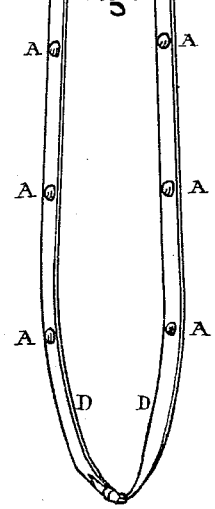
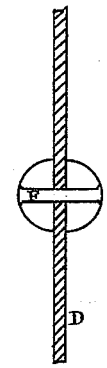
Witnesses — Inventor —

UNITED STATES PATENT OFFICE.

GEORGE W. COOK, OF CHICAGO, ILLINOIS, ASSIGNOR OF TWO-THIRDS HIS RIGHT TO JOHN R. JONES, OF PHILADELPHIA, PENNSYLVANIA, AND JAMES POTTER, OF CHICAGO, ILLINOIS.

IMPROVEMENT IN DRIVING-REINS.

Specification forming part of Letters Patent No. 148,550, dated March 17, 1874; application filed January 15, 1874.

*To all whom it may concern:*

Be it known that I, GEORGE W. COOK, of Chicago, in the county of Cook and State of Illinois, have invented certain Improvements in Bridle-Reins, of which the following is a specification:

My invention relates to the attaching of buttons or hand-pieces forming balls to that part of the reins which is held in the hands of a person driving or riding horses or mules, the object being to give the person driving a firmer and more reliable hold of the reins, and consequently a better control of the animal being driven, as also to prevent the reins from continually slipping through the fingers, and the consequent cramping of the hand or fingers in the effort to hold the reins firm.

Figure 1 is a view of a set of reins to which is attached my invention, as shown at A A A A A A. Figs. 2 and 4 are front views, showing the relative position and size of the rein and button or mold as attached. Figs. 3 and 5 are sections through Figs. 2 and 4.

I make and attach my invention in the following manner: Out of metallic, rubber, ivory, or any other suitable substance, I form thick buttons or molds, which, when placed opposite each other, with the strap or flat part of the reins between them, constitute a round ball, or nearly such, the circle of the button quite, or nearly, covering the width of the rein, as shown in Figs. 2 and 4 and 3 and 5. D represents parts of the rein. I fasten the buttons to the reins by means of a rivet passing through both the buttons and the rein, as shown at F in Fig. 5, or by means of a screw, as shown at Fig. 3, or by using the ordinary nut and screw. (Not herein shown.) Another neat mode of applying the buttons is to first secure them to the reins, as above described, then cover them with thin leather, and stitch or sew around the entire circle through the three thicknesses thus formed.

In forming metallic buttons, in order that the weight shall be no objection, I chamber out the inner or hidden surface, as shown at E in Fig. 3. I place from eight (8) to sixteen (16) buttons on each pair of reins, as may be desired, these forming four, (4,) six, (6,) or eight (8) balls, and I place the balls so formed from six (6) to eight (8) inches apart, distributing the whole number upon that part of the reins which will render them useful and most convenient in holding both a tight or loose rein.

What I claim as new, and desire to secure by Letters Patent, is—

A series of buttons combined with harness-lines, arranged and attached as described, and for the purposes set forth.

GEORGE W. COOK.

Witnesses:
 JAMES POTTER,
 JNO. R. JONES.